United States Patent [19]
Gehani et al.

[11] Patent Number: 5,765,171
[45] Date of Patent: Jun. 9, 1998

[54] MAINTAINING CONSISTENCY OF DATABASE REPLICAS

[75] Inventors: Narain H. Gehani, Summit; Alex Kononov, Bridgewater; Michael Rabinovich, Gillette, all of N.J.

[73] Assignee: Lucent Technologies Inc., Murray Hill, N.J.

[21] Appl. No.: 580,954

[22] Filed: Dec. 29, 1995

[51] Int. Cl.[6] .................................................. G06F 17/30
[52] U.S. Cl. .................................................. 707/203; 707/8
[58] Field of Search .......................... 395/200.01, 200.3; 707/203, 201, 8

[56] References Cited

U.S. PATENT DOCUMENTS

| | | | |
|---|---|---|---|
| 5,280,612 | 1/1994 | Lorie et al. | 707/8 |
| 5,473,772 | 12/1995 | Halliwell et al. | 395/712 |
| 5,551,048 | 8/1996 | Steely, Jr. | 707/201 |
| 5,574,906 | 11/1996 | Morris | 707/1 |
| 5,600,834 | 2/1997 | Howard | 707/201 |

*Primary Examiner*—Parshotam S. Lall
*Assistant Examiner*—Kenneth R. Coulter

[57] ABSTRACT

A replication protocol which includes associating a database version vector with each copy of the database in the system is provided. Each database version vector keeps track of the total number of updates to any data items in its respective database replica and from which server those updates were originally performed. During replication between two replicas, the database version vectors of the replicas are compared to efficiently determine if update replication is necessary. If the database version vectors are not identical, the server possessing the more recent version of the data items propagates those data items to the server whose replica is older using conventional update propagation techniques. Identical database version vectors indicate that update propagation is not necessary. As such, the protocol avoids examining every data item in the database in order to determine the necessity of update propagation, which is required in conventional replication protocols.

14 Claims, 3 Drawing Sheets

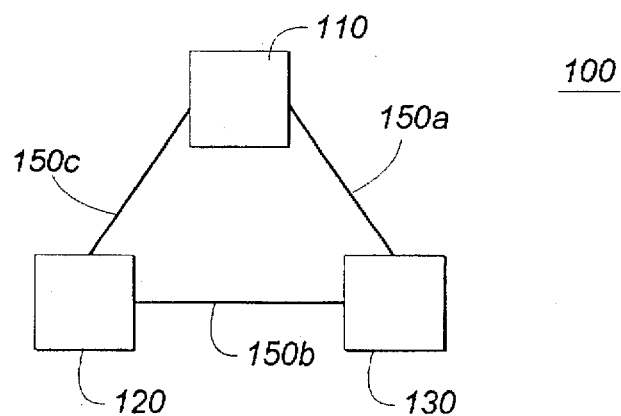
FIG. 1
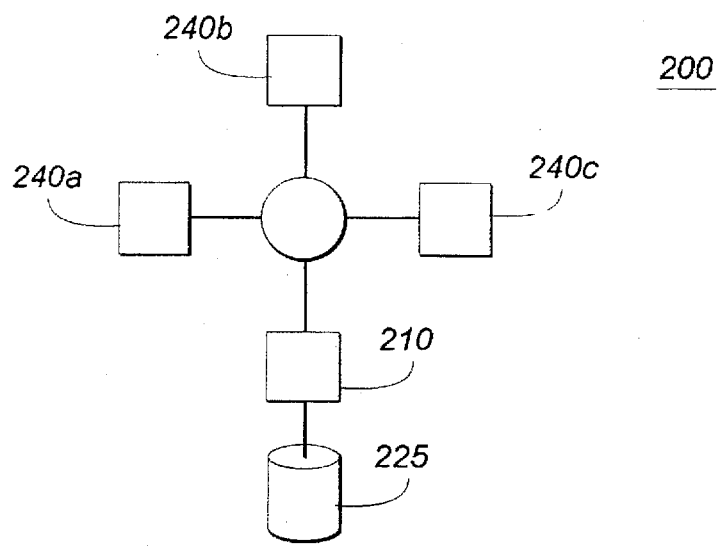
FIG. 2
$$V_{X_1}\bigl[(1,5)(2,4)(3,0)(4,2)\bigr]$$
$$V_{X_2}\bigl[(1,2)(2,4)(3,0)(4,0)\bigr]$$
$$V_{X_2}^{new}\bigl[(1,5)(2,4)(3,0)(4,2)\bigr]$$
FIG. 3

$$DBVV_r \quad [V_1, V_2, V_3 \ldots V_n]$$

$$VV_{X_O} \quad [V_{O1}, V_{O2}, V_{O3} \ldots V_{On}]$$

$$VV_{X_r} \quad [V_{r1}, V_{r2}, V_{r3} \ldots V_{rn}]$$

$$DBVV_r^{new} \quad [V_1 + (V_{O1} - V_{r1}), V_2 + (V_{O2} - V_{r2}),$$
$$V_3 + (V_{O3} - V_{r3}), V_n + (V_{On} - V_{rn})]$$

FIG. 6

MAINTAINING CONSISTENCY OF DATABASE REPLICAS

FIELD OF THE INVENTION:

The present invention relates to a distributed processing system and, more particularly, to maintaining consistency of database replicas within the distributed system.

BACKGROUND OF THE INVENTION

In distributed systems, access to data items is often facilitated by database servers. A database server provides storage of data items grouped into databases. An application running on a client station, such as a personal computer, can access a data item by connecting to the database server that stores the corresponding database. A common scenario associated with distributed systems is that some clients are geographically located a great distance away from the server. Access to the database by these clients is generally by remote connections, e.g., dial up connections. Remote connections can incur long distance charges which result in added cost. Also, remote connections tend to have less bandwidth capability, thereby decreasing system performance. To improve performance and reduce cost in distributed systems, replicas of the database are stored on multiple servers, each advantageously located in proximity to various groups of clients. "Replica," as used herein, refers to a copy of a database. Such systems are known as replicated distributed systems. However, the existence of more than one replica of the database requires replica management protocols to ensure that the data in all database replicas are consistent.

In many conventional replicated systems, replica consistency is achieved with the use of epidemic protocols such as those described in Demers et al., *Epidemic Algorithms for Replicated Database Maintenance*, Proc. of 6th Symp. on Principles of Distr. Computing, p. 1–12 (1987); Ladin et al., *Providing High Availability Using Lazy Replication*, ACM Trans. on Computing Systems, p. 360–391 (November 1992); and Guy et al., *Implementation of the Ficus Replicated File System*, Proc. of Usenix Summer Conf., p. 63–71 (1990), all incorporated by reference for all purposes. Such protocols perform user operations, such as reads and updates, on a single replica. All updates are then propagated to the other replicas asynchronously during a scheduled replication procedure. In general, the replication procedure between a source replica and a recipient replica involves 1) determining if the source replica contains updates that need to be sent to the recipient server, and 2) propagation of those updates to the recipient server in order to maintain consistency between the replicas.

In epidemic protocols, the step for determining whether or not update propagation is necessary includes the pair-wise comparison of version information of corresponding copies of all data items in the source and recipient replicas. The version information, which is associated with each copy of every data item, is used to identify more recent copies of data items. For example, the version information may comprise the number of updates made to its respective copy of the data item. The copy possessing version information reflecting more updates, in general, is the more recent copy of the data item. Conventional techniques used to represent version information include version numbers and version vectors as described in Gifford, D.K., *Weighted Voting For Replicated Data*, Proc. 7th ACM SIGOPS Symposium on Operating Principles, pp. 150–159 (1979) and Parker, D.S., et al., *Detection of Mutual Inconsistency in Distributed Systems*, IEEE Trans. on Software Eng. 9(3) pp. 240–246 (May 1983), both herein incorporated by reference for all purposes.

The periodic pair-wise comparison of version information introduces overhead. This overhead increases linearly with the number of data items, thus limiting the scalability of epidemic protocols. A protocol for avoiding the unnecessary processing overhead associated with pair-wise comparison of data items is proposed in Lotus Notes. In Lotus Notes, version information of a data item copy includes a sequence number and modification time. The sequence number records the number of updates to the respective copy of the data item; the modification time contains the time of the last modification of the corresponding data item copy. In addition, each server records the time when it propagated updates from its replica to every other server. This is referred to as the "last propagation time." Also, each server stores a database modification time which is the time of the last modification to any data item in its database replica.

During a scheduled replication session between source and recipient servers, the source server verifies if any data item in its database replica has changed since the last scheduled replication session between the two. Verification entails comparing the database modification time in the source server with the last propagation time between the source and recipient servers. If the database modification time is less recent than the last propagation time, then no data item has changed and the replication session terminates. Otherwise, the source server examines each data item in its replica to determine which of the data items has changed since the last update replication session. This is done by comparing the modification time of each data item copy with the last replication time between the source and recipient servers. The source server compiles a list of the data items that has been modified since the last update replication session and sends it to the recipient server. The entries in the list include the data item names and their sequence numbers. The recipient server compares the sequence numbers of the data items in the list with the sequence numbers of the same data items in its replica and copies those data items from the source server which have the greater sequence number.

The Lotus Notes protocol may detect in constant time if update propagation is not required, but only if no data item in the source database has been modified since the last propagation with the recipient. However, in many cases, the source and recipient database replicas will be identical even though the source database has been modified since the last update propagation to the recipient. For instance, after the last propagation between themselves, both nodes may have performed update propagation from other nodes and copied some data modified there. Or, the recipient database may have obtained updates from the source indirectly via intermediate nodes.

In these cases, the Lotus Notes protocol incurs high overhead for attempting update propagation between identical database replicas. At the minimum, this overhead includes comparing the modification time of every data item in the source database against the time of the last update propagation. Thus, it grows linearly in the number of data items in the database. Clearly from the above discussion, it is therefore desirable to provide a protocol that determines whether replication is necessary between two replicas without incurring overhead associated with examining all data items in either the source and/or recipient database replicas.

SUMMARY OF THE INVENTION

The invention relates to a replicated distributed system comprising a plurality of servers and a plurality of database replicas which comprises a plurality of data items. For purposes of discussion, it is not important to distinguish between the copies of the database replicas and the original database. As such, the term "database replicas" refers to both the copies of the database as well as the original database. The system includes at least n database replicas corresponding to n servers, where n is $\geq 2$, and wherein each of the n database replicas comprises at least x data items, where x is $\geq 2$.

In accordance to the invention, a protocol maintaining consistency among the x data items in the n replicas is provided. The protocol efficiently determines the necessity of update propagation between any two of the n servers. According to one embodiment, version information, such as version vectors, is associated with each copy of the x data items in each of the n database replicas. The version vector records the number of updates made to its respective data item and on which of the n servers that the updates were originally performed. Additionally, the protocol provides a database version vector for each of the n database replicas. The database version vector keeps track of the total number of updates that were applied to any of the x data items in its respective database replica and on which of the n servers each update was originally performed.

In one embodiment, the database version vector comprises at least n number of components, each corresponding to one of the n number of servers having a database replica. When any of the x data items in a database replica is updated or copied from another server, the components of the database version vector associated with that database replica are modified appropriately to indicate the number of additional updates and on which server these updates were originally performed.

During a replication session between two of the n servers, the protocol compares the database version vectors of the two replicas to determine if update propagation is necessary. If the database version vectors are not identical, then the server possessing the more recent version of the data items propagates those data items to the server whose replica is older using conventional update propagation techniques. Identical database version vectors indicate that update propagation is not necessary. As such, the protocol avoids examining all data items in the database to determine the necessity of update propagation, which is required in conventional replication protocols.

BRIEF DESCRIPTION OF THE DRAWINGS

FIG. 1 is a simplified illustration of a conventional replicated distributed system;

FIG. 2 is an exemplary site within the distributed system of FIG. 1;

FIG. 3 illustrates examples of updating version vectors;

FIG. 6 illustrates an example of updating database version vectors when version vectors are employed to represent version information of data items.

DETAILED DESCRIPTION

Figure 4:
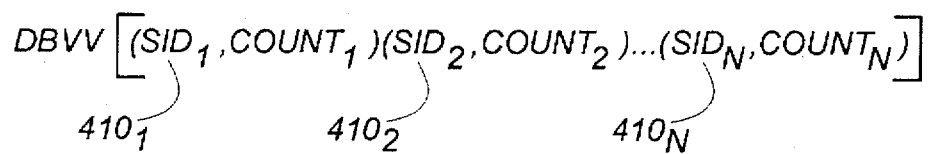
FIG. 4 is an exemplary illustration of a database version vector.

The invention relates to a replicated distributed system. In particular, the invention is directed to a protocol which efficiently determines if update propagation between two replicas of the same database is required. Referring to FIG. 1, a simplified illustration of a conventional replicated distributed system 100 is shown. Such systems are described in Berson, *Client/Server Architecture*, McGraw-Hill, Inc., 1992, herein incorporated by reference for all purposes. Distributed system 100 comprises sites 110, 120, and 130 networked together by communication links 150a–150c. The physical implementation of the communication links is not important. For example, the communication links may be a local area network (LAN) or a wide area network (WAN) interconnecting sites at geographically dispersed locations. The sites may also be "loosely connected", i.e., connected through dial-up connections or wireless connections such as satellite links.

FIG. 2 is an exemplary site 200 of the distributed system. As shown, the site includes a plurality of clients 240a–240c networked to a server 210 by a LAN, MAN, or WAN. The clients, for example, may be personal computers, workstations, or terminals. Other clients (not shown) may be connected via remote links. While the clients are shown to be associated with a particular site, it is understood that they may connect to other servers at other sites within the system using remote links, such as dial-up connections using modems, wireless connections such as satellite links, or connections via the internet. Furthermore, it is understood that clients may have similar or different configurations from each other, and other clients (not shown) may be included as desired. In addition, one or more clients may be located on the server. Server 210 is, in some embodiments, a mainframe computer system, a workstation, or a personal computer that includes non-volatile storage device 225, such as magnetic disks or optical disks for data storage. The data being stored in the storage device 225 includes data items which are organized into one or more groups called databases.

Referring back to FIG. 1, a copy or replica of the same database is stored in the memory of the servers located at sites 110, 120, and 130. For the sake of brevity, servers 110, 120, and 130 refer to servers located at sites 10, 120, and 130, respectively.

The clients at the various sites provide users with an interface to communicate with servers to read and update data items. An "update" refers to modification of one or more data items at the request of a client. When updates are made on a server, these updates are propagated to other servers during a replication session to make all replicas consistent with each other. In addition, a server may obtain a more recent version of a data item via out-of-bound copying. "Out-of-bound copying" refers to the acquisition of a more recent version of a data item directly from another server outside the context of the normal replication procedure. Out-of-bound copying occurs when a user application requires the most recent version of a data item and that it resides on another server.

In accordance with the invention, a protocol which efficiently determines the necessity of update propagation is provided. As discussed, update propagation between the source and recipient servers involves sending those data items or updates which are more current or newer in the source replica to the recipient replica. To determine the relative age of the copies of data items in the two replicas, version information such as version vectors (VVs) are used. Before discussing the invention further, it will be useful to provide a description of VVs. A detailed discussion of version vectors can be found in Popek et al., *LOCUS: A Network Transparent, High Reliability Distributed System*, In Proc. 8th Symp. on Operating Systems Principles, pp. 169–177 (1981), which is herein incorporated by reference for all purposes.

In general, a VV comprises n components, each being associated with one of the n number of servers that have a copy of the data item. Each component includes a numeric value reflecting the number of updates made by the corresponding server. In one embodiment, the VV may be implemented with each component being in the form of (sid, count), where sid is a server ID that corresponds to a server in the system, and count corresponds to the number of updates made by the server identified by sid. At initialization, all count components of the VV are set to zero. When a server receives an update request from a client to which it is connected, the count in the component corresponding to itself is incremented by 1 to reflect the update. However, if a server copies a data item from another server, via the update propagation or out-of-bound copying (which is performed only if the source server's copy the data item has a VV which is component-wise greater than or equal to the VV of the recipient server's copy), the VV is updated as follows: The counts in each component of the two VVs are compared, and the larger count becomes the count for that component in the updated VV. In alternative embodiments, the $i^{th}$ position of count in the VV represents the $i^{th}$ server in the system where i is from 1 to n; $n \geq 2$.

Complying with the rules for maintaining VVs, the following corollaries are true. First, if two copies of the same data item, $x_1$ (residing on server 1) and $x_2$ (residing on server 2), have component-wise identical VVs, then these copies are identical. Second, if the VV component corresponding to server 3 for $x_1$ ($v_{13}$) and $x_2$ ($v_{23}$) is such that $V_{13} < v_{23}$ and $v_{23} - v_{13} = z$, then $x_1$ has seen z fewer updates performed by server 3. Furthermore, the missed updates are the last updates that server 3 applied to $x_2$ (via update propagation or out-of-bound copying). And third, $x_1$ is older than $x_2$ if and only if a) $x_1$'s VV is component-wise smaller or equal to $x_2$'s VV and b) at least one component of $x_1$'s VV is strictly less than the corresponding component of $x_2$'s VV.

FIG. 3 is an illustrative example of how VVs associated with copies of a data item x are updated. As shown, servers 1, 2, 3, and 4 each have a copy of x in their respective replica. $Vx_1$ represents the VV for the copy of x maintained on server 1, and $Vx_2$ represents the VV for the copy of x on server 2. The VVs include four components, each corresponding to a server. $Vx_1$ shows that server 1's copy of x has seen 5 updates from a client or clients connected to itself, 4 updates on server 2, 0 updates on server 3, and 2 updates on server 4. The updates on servers 2 and 4 may have occurred on either update replication between the servers or out-of-bound copying of x. $Vx_2$ shows that server 2 received 2 updates from server 1, 4 updates from its client(s), and 0 updates from servers 3 and 4. Comparing the two VVs indicates that server 1's copy of x is more current than server 2's copy because 1) every component of $Vx_2$ is smaller or equal to the corresponding component in $Vx_2$, and 2) at least one component in $Vx_2$ is strictly less than the corresponding component in $Vx_1$. $Vx_2^{new}$ represents the VV for server 2's copy of x after it has been updated from server 1. Following the rules for updating VVs, the component-wise maximum becomes the new count for that component. As a result, the count corresponding to server 1, 2, 3, and 4 is 5, 4, 0, and 2, respectively. Other conventional techniques, such as version numbers, are also useful to determine the version of a data item.

Returning back to the description of the invention, a unique vector, referred to as a "database version vector" (DBVV) is associated with each database replica in the system. Each DBVV keeps track of the total number of updates made to any data item in its respective database replica and on which server each update was originally performed. Although the structure of DBVVs is similar to VVs, the two types of vectors are quite different in nature. VVs are associated with copies of individual data items while DBVVs are associated with the replicas of the entire database. This difference in granularity entails different properties of VVs and DBVVs. For instance, identical VVs of different copies of the same data item reflect that the copies are identical. However, this is not the case for DBVVs. Since a DBVV is associated with the entire database, it reflects the total number of updates to the database, not to any specific data item. As such, two replicas may have the same total number of updates performed by a given server but applied to different data items. This would result in the two non-identical replicas having identical DBVVs. Furthermore, the comparison of the VVs of two different copies of the same data item determines the relationship between these copies. For example, a copy of a data item is older than another if its VV is component-wise smaller or equal to the other copy's VV and at least one component of its VV is strictly less than the corresponding component of other copy's VV. In contrast, a comparison of DBVVs of a source and recipient database replicas does not identify their relationship. Even though the recipient replica's DBVV appears older (i.e., component wise smaller), than the source replica's DBVV, it does not indicate that all data items in the recipient replica are older than those in the source replica. However, while DBVVs appear to lack any substantive information, they are effective in determining if update propagation between a source and recipient server is necessary.

In accordance with the invention, the DBVVs of the source and recipient replicas are compared to determine if update propagation is necessary during scheduled replication between a source server and a recipient server. If the replicas are identical, no update propagation is performed. If, on the other hand, the replicas are not identical, conventional techniques are used to propagate the updates to the recipient server.

To elaborate on how updates are tracked by each DBVV, the following example is provided. Assume that server 110 applies an update to, for example, data item x in its replica. To indicate that the replica in server 110 has undergone one update, its DBVV will be modified to show this additional update by server 110. Suppose that in a subsequent operation, server 110 copies a newer version of data item y from server 120, either during replication process between it and server 120 or from an out-of-bound copying operation. Further, assume that the newer version of y, when compared to server 110's old version, has 3 additional updates applied by server 120 and 2 additional updates applied by server 130. This requires that in the DBVV associated with the replica in server 110, the number of updates originally performed by server 120 and 130 be increased by 3 and 2, respectively.

As previously discussed, due to the coarse granularity of DBVVs, non-identical database replicas may have identical DBVVs, thus preventing more recent versions of data items from being propagated to the recipient server. For example, server 110 makes one update to data item x and data item y. Subsequently, server 120 copies x from server 110, and server 130 copies y from server 110. At this point, $DBVV_{120}$ and $DBVV_{130}$ both reflect one update from server 110, resulting in identical database version vectors. However, database replicas in server 120 and 130 are clearly not identical. In this situation, the update replication process between server 120 and 130 will not propagate any updates because both servers have identical DBVVs.

On the surface, this appears to be a problem associated with using DBVVs in replicated distributed systems. However, it can be shown that if replication is scheduled in such a way that every server communicates directly or indirectly with every other sever, this issue is resolved. Using the above example, a replication schedule may include periodically performing replication between server 110 and 120 and between 120 and 130. As such, the update to y in server 110 will be propagated to server 120 during replication between servers 110 and 120. $DBVV_{120}$ will be updated to reflect two updates from server 110. As a result, $DBVV_{120}$ will show one more update from server 110 than $DBVV_{130}$. This will cause the update to x to be propagated to server 130 during replication between servers 120 and 130. Thus, scheduling replication such that all servers communicate directly or indirectly with each other ensures eventual propagation of updates to all the replicas. Since conventional epidemic protocols also schedule replication so that every server in the system communicates with each other directly or indirectly to ensure eventual propagation of updates to all replicas, the above requirement for scheduling replication does not impose additional overhead or restriction on the system.

Referring to FIG. 4, an illustrative embodiment of a DBVV 400 is shown. The DBVV contains N entries $410_1$–$104_N$, each corresponding to one of the N number of servers that maintain a database replica. Each entry, for example, is in the form of (SID, COUNT), where SID is a server ID that identifies a server in the system, and COUNT is an integer called the update count. The update count indicates the number of updates originating from the server contained in SID. For example, when a server receives an update from a client which is connected to it, the server updates the COUNT value in the entry corresponding to itself. Other entries corresponding to other servers are updated accordingly when the server acquires updates from another server, either during replication procedure or by out-of-bound copying. In alternative embodiments, the $i^{th}$ position of count in the DBVV can be used to correspond to the $i^{th}$ server in the system.

Figure 5:
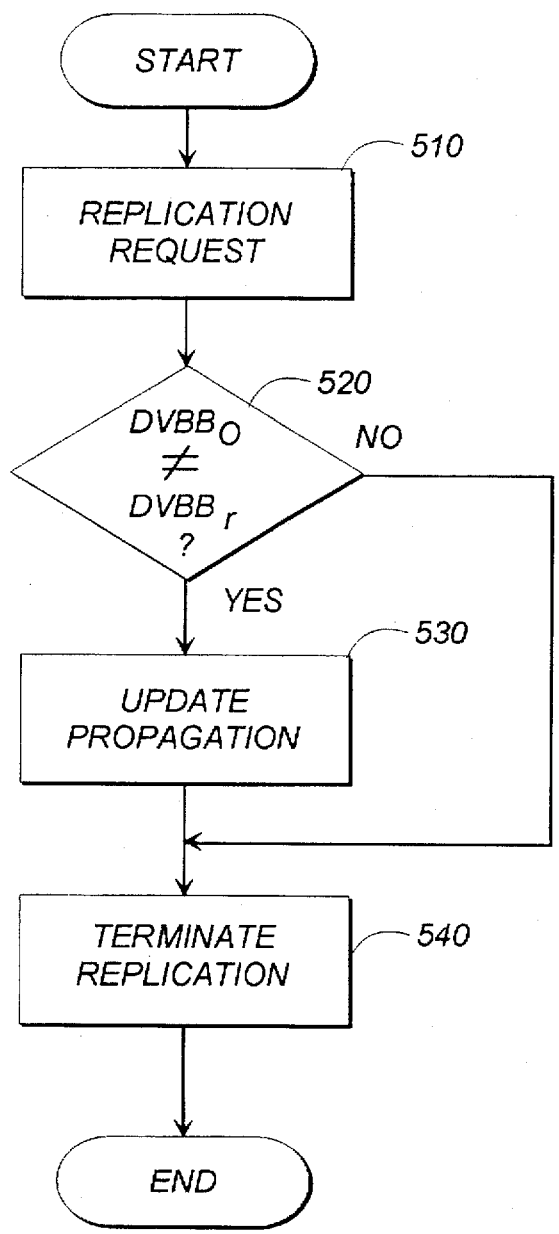
FIG. 5 is a flow diagram depicting the steps for performing update propagation.

FIG. 5 is a flow diagram depicting the steps of the replication process between a source server and a recipient server in accordance with one embodiment of the invention. At step 510, the source or originating server sends an update replication request along with its database version vector ($DBVV_o$) to the recipient server. At step 520, the recipient server compares its database version vector ($DBVV_r$) to $DBVV_o$. If $DBVV_o$ and $DBVV_r$ are not identical, i.e., the count values of corresponding entries in both $DBVV_o$ and $DBVV_r$, are not equal, then replication is necessary. As such, the server proceeds to step 530 where updates are propagated to the recipient server. Upon completion of update propagation, the server terminates the replication process at step 540. If, on the other hand, $DBVV_o$ and $DBVV_r$ are identical, then the server proceeds to step 540 where the update replication process between the source and recipient servers terminates. By comparing $DBVV_o$ with $DBVV_r$, the recipient server can quickly determine whether updates are required without having to analyze each and every single data item in the database.

The source server propagates updates to the recipient server using various conventional update propagation protocols. One such protocol, for example, is employed in Lotus Notes. This protocol performs update propagation by comparing version information of data items in the source and recipient replicas and copying the newer version of those data items in their entirety from the source server's database replica into the recipient server's database replica. Other update propagation protocols, such as the two-phase gossip protocol can also be used. A description of this protocol is provided in Heddaya, et al., *Two-Phase Gossip: Managing Distributed Event Histories*. Informational Science, Vol. 49, pp. 35–57 (1989), herein incorporated by reference for all purposes. In general, the two-phase gossip protocol stores each update to a data item in a log as an update record. The update record contains sufficient information to reconstruct the updated state of a data item given the version before the update. In addition, the update record contains the identity of the server that originally performed the update. During the replication session, these update records are then propagated to the recipient server as a stream of update records and each record is applied to the appropriate data items in the recipient replica in the order they were applied in the source replica. Depending on whether complete data items or update records are propagated, different techniques for maintaining DBVVs are employed.

Maintenance of DBVVs for protocols which propagate updates by copying data items in their entirety is as follows: When the system is initialized, all COUNT components of the DBVVs are set to 0. This reflects the fact that all database replicas are identical at initialization, thus identical DBVVs. Anytime a server ($S_o$) makes an update to any data item in its replica, the component of its DBVV corresponding to $S_o$ is incremented. When $S_o$ replaces its copy of a data item with a newer version, either during update propagation or out-of-bound copying, the DBVV is modified to reflect the extra updates acquired with the newer version of the data item.

FIG. 6 is an illustrative example showing how the DBVV of a recipient server ($DBVV_r$) is modified when VVs are used to represent version information of data item. $DBVV_r$ includes n components ($V_1$ to $V_n$) corresponding to the n number of servers with a replica of the same database. $VVx_o$) and $VVx_r$ are the VVs associated with the originating and recipient servers'copy of data item x, respectively. The VVs also include n number of components corresponding to the n number of servers having a copy of x.

$DBVV_r^{new}$ reflects the modifications to $DBVV_r$ after $x_o$ is copied to the recipient server's replica, either during replication or out-of-bound copying. As shown, each $DBVV_r$ component is updated by adding the difference of the corresponding VV component pair to it. This rule for modifying each component of $DBVV_r$ can be formalized as follows:

$$V_k^{new}=V_k^{old}+(V_{ok}-V_{rk}); 1 \leq k \leq n$$

where $V_k^{new}$ is the modified component of $DBVV_r$ corresponding to $k^{th}$ server, $V_k^{old}$ is the original component of $DBVV_r$ corresponding to server k, and $v_{ok}$ and $v_{rk}$ are respectively the components in the VV of the originating and recipient servers'copy of x corresponding to server k. The difference of the VV components ($v_{ok-vrk}$) reflects the number of additional updates made to the newer version of x by the server k.

Maintenance of DBVV in a system employing protocols which propagate updates as a stream of update records is as follows: When the system is initialized, all COUNT components of the DBVVs are set to 0. This reflects the fact that all database replicas are identical at initialization, thus identical DBVVs. Anytime a server ($S_o$) makes an update to any data item in its replica, its DBVV is also modified to reflect that the replica has been updated. For updates at the request of a client, $S_o$ increments the DBVV component in its DBVV corresponding to $S_o$. If an update arrived in the update record from another server, e.g., during update propagation, then the component in $S_o$'s DBVV corresponding to the server that originally performed the update is incremented. For example, $S_o$ received an update record from $S_i$, but the update was originally performed on $S_j$. In this case, the component in $S_o$'s DBVV corresponding to $S_j$ is incremented.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but instead should be determined with reference to the appended claims along with their full scope of equivalents.

The invention claimed is:

1. In a computer network comprising a plurality of servers and a plurality of database replicas comprising a plurality of data items, at least n database replicas corresponding to n number of servers, where n≧2, and wherein each of the n database replicas comprises at least x number of data items, where x is≧2, a method for operating the network including maintaining consistency among the x data items in the n replicas comprising:

associating version information with the x data items in each of the n replicas, the version information recording the number of updates performed reflected on its responsive data item copy and on which of the n servers that the updates were originally performed;

providing n database version vectors (DBVVs), each corresponding to one of the n database replicas;

maintaining each of the n DBVVs to indicate updates that were applied to any of the x data items in the DBVV's respective database replica and originally performed by the corresponding server; and directly comparing the n DBVVs to each other to make an initial threshold determination of whether any of the data items in any of the DBVVs have been recently updated and thus require that a full comparison be made at the data item level to determine which of the data items in each of the database replicas need updating in order to restore complete consistency among each of the data items in the n replicas.

2. The method of claim 1 wherein each of the DBVVs comprises at least n components which correspond to the n servers, each of the components indicates updates that are reflected in the DBVV's respective database replica and originally performed by the corresponding server.

3. The method of claim 2 wherein maintaining each of the DBVVs comprises:

in response to a first one of n servers performing an update, modifying the DBVV corresponding to the first server by incrementing its component corresponding to the first server to reflect the update; and in response to the first server copying one of the x number of data items from a second one of n servers, modifying the components of the DBVV corresponding to the first server to reflect any additional updates acquired as a result of the copying from the second server and on which of the n servers that the additional updates were originally performed.

4. The method of claim 2 further comprises the step of scheduling a replication session between a first and a second of the n servers for propagating updates to maintain consistency between the database replicas of the first and second servers.

5. The method of claim 4 wherein the replication session comprises the steps of:

determining whether propagation of updates from the database replica of the first server to the database replica of the second server is necessary; and propagating updates from the first database replica to the second database replica if update propagation is determined to be necessary.

6. The method of claim 5 wherein the determining step comprises comparing the DBVVs associated with the first replica with the second replica, and wherein identical DBVVs indicates that update propagation is not necessary and non-identical DBVVs indicates that update propagation is necessary.

7. The method of claim 6 wherein update propagation comprises sending more recent data items in the first replica to the second replica.

8. The method of claim 7 wherein the data items that are to be sent are determined by comparing the version information of the data items in the first replica with the version information of the corresponding data items in the second replica to identify the data items which are more recent in the first replica.

9. The method of claim 8 wherein the version information comprises version vectors, the version vectors comprising at least n components corresponding to the n servers, each of the n components indicates the number of updates to the version vector's respective data item by the corresponding server.

10. The method of claim 9 wherein in response to receiving the more recent data items, the second server modifies the components in its DBVV to reflect any additional updates acquired as a result of the update from the first server and on which of the n servers that the additional updates were originally performed as follows:

$$V_k^{new} = V_k^{old} + (V_{1k} - V_{2k}); 1 \leq k \leq n$$

where $V_k^{new}$ is the modified component of the second server's DBVV corresponding to the $k^{th}$ server, $V_k^{old}$ is the original component of the second server's DBVV corresponding to the $k^{th}$ server, $V_{1k}$ is the version vector component of the data item on the first server which corresponds to the $k^{th}$ server, and $V_{2k}$ is the version vector component of the data item on the second server which corresponds to the $k^{th}$ server.

11. The method of claim 6 wherein updates are stored as update records that contain information sufficient to redo the update and the identity of the server on which the update was originally performed.

12. The method of claim 11 wherein update propagation comprises sending the update records from the first server to the second server.

13. The method of claim 12 wherein the version information comprises version vectors, the version vectors comprising at least n components corresponding to the n servers, each of the n components indicates the number of updates to the version vector's respective data item by the corresponding server.

14. The method of claim 13 wherein the DBVVs, in response to receiving one of the update records from the first server, the second server increments the component in its DBVV corresponding to the server on which the update was originally performed.

* * * * *